(12) United States Patent  
Lawson et al.

(10) Patent No.: US 6,406,005 B1
(45) Date of Patent: Jun. 18, 2002

(54) DIFFUSER FOR AERATING A FLUID

(75) Inventors: Thomas Urie Lawson, Greenwich; Mark Monier Michael, Kingsford, both of (AU)

(73) Assignee: Aquatec-Maxcon Pty Ltd, New South Wales (AU)

( * ) Notice: Subject to any disclaimer, the term of this patent is extended or adjusted under 35 U.S.C. 154(b) by 0 days.

(21) Appl. No.: 09/297,780

(22) PCT Filed: Nov. 12, 1997

(86) PCT No.: PCT/AU97/00785

§ 371 (c)(1),
(2), (4) Date: Aug. 4, 1999

(87) PCT Pub. No.: WO98/21151

PCT Pub. Date: May 22, 1998

(30) Foreign Application Priority Data

Nov. 12, 1996 (AU) .............................................. PO3573

(51) Int. Cl.[7] .............................. B01F 3/04; C02F 3/20
(52) U.S. Cl. ................................ 261/122.1; 261/122.2; 261/124; 261/DIG. 70; 210/220
(58) Field of Search ........................... 261/122.1, 122.2, 261/124, 100, DIG. 70; 210/220; 239/145

(56) References Cited

U.S. PATENT DOCUMENTS

| | | | |
|---|---|---|---|
| 3,153,682 A | * 10/1964 | Walker | ........................ 261/124 |
| 3,954,922 A | * 5/1976 | Walker et al. | ............... 261/124 |
| 4,007,240 A | 2/1977 | Godsen | |
| 4,288,394 A | * 9/1981 | Ewing et al. | ............. 261/122.1 |
| 4,820,412 A | 4/1989 | Meyer-Rudolphi et al. | |
| 4,849,139 A | * 7/1989 | Jäger | ........................ 261/122.2 |
| 4,981,623 A | 1/1991 | Ryan | |
| 5,015,421 A | 5/1991 | Messner | |
| RE33,812 E | * 2/1992 | Schneider | ................. 261/122.2 |
| 5,093,047 A | * 3/1992 | Zeppenfeld | .............. 261/122.1 |
| 5,098,581 A | 3/1992 | Roediger | |
| 5,204,028 A | * 4/1993 | Ruston | ..................... 261/122.1 |
| 5,330,688 A | * 7/1994 | Downs | ..................... 261/122.2 |

FOREIGN PATENT DOCUMENTS

| | | |
|---|---|---|
| DE | 4104287 | 8/1992 |
| EP | 385198 | 9/1990 |
| EP | 625484 | 11/1994 |
| EP | 704.237 | 4/1996 |
| EP | 741112 | 11/1996 |
| GB | 1304147 | 1/1973 |

OTHER PUBLICATIONS

Derwent Abstract Accession No. 86–053322/08 (Yokohama Rubeer KK).

* cited by examiner

Primary Examiner—Duane Smith
Assistant Examiner—Jason M. Greene
(74) Attorney, Agent, or Firm—Rodman & Rodman

(57) ABSTRACT

A diffuser for aerating a fluid, and particularly for aeration in waste water treatment tanks, is formed in an elongate configuration by manufacturing a base plate from an extrusion cut to the desired length. A perforated elastomeric membrane is secured to the base plate by pressing sealing strips along the elongate edges of the membrane into corresponding grooves formed in the base plate extrusion. The ends of the membrane are sealed to the base plate by end strips or clamps. Air is introduced through apertures in the base plate causing the membrane to inflate away from the base plate forming an interior compartment for the passage of air along the diffuser. Apparatus for securing the diffuser to a horizontal header pipe is also described.

18 Claims, 4 Drawing Sheets

DIFFUSER FOR AERATING A FLUID

FIELD OF THE INVENTION

The present invention relates to a diffuser for aerating a fluid. The diffuser has particular application in the aeration of domestic and industrial waste water. The invention also provides a method for securing a diffuser to a pipe.

BACKGROUND OF THE INVENTION

Aeration diffusers act by converting a gaseous flow into a stream of fine bubbles in a fluid. Ceramic materials have been used extensively in diffusers for the purpose of forming bubbles. Typically, the ceramic material is in the form of a disk or dome. Fine pores within the ceramic material allow the formation of the bubbles on an outer surface of the ceramic material when an air flow is passed through it. However, when the air flow is stopped, grit and biomass present in surrounding fluid may enter the pores of the ceramic material resulting in the clogging of the diffuser. Accordingly, ceramic material is unsuitable for applications where frequent interruptions to air flow may occur.

Another type of known diffuser consists of a horizontally orientated PVC tube enclosed within an elastomeric sleeve fastened at either end of the tube by clamps in the form of bands. Air is passed through ports in the PVC tube to an annular space formed between the PVC tube and the elastomeric sleeve. As air pressure within the annular space increases small slits in the sleeve open allowing the air to pass through the sleeve and form bubblers on its exterior surface. When the flow of air is stopped the slits in the membrane close thereby inhibiting back flow of fluid into the diffuser. Such diffusers are inefficient as the underside of the sleeve is inoperative and therefore redundant, and bubbles tend to coalesce on the more vertical sides of the sleeve, reducing efficiency.

Elastomeric membranes in the form of a sheet have also been used on disk and rectangular plate type diffusers and have in the past been secured to the diffusers by cover plates and screws, or like means. However, securing in this manner is cumbersome and time consuming.

Known plate diffusers, generally, are relatively small and usually are less than half a metre in diameter or length. This relatively small size necessitates a large number of diffusers and extensive pipe work to connect the required number of diffuser assemblies in a given installation to an air supply, and results in increased assembly time and elevated installation costs.

Piping having specialised, usually threaded, fittings which engage with corresponding fittings on diffusers is used in diffuser installations. The piping is frequently square or round section steel or stainless steel pipe. piping of this type is relatively expensive and the use of such fittings requires extensive preparation of the piping and so also adds to assembly and installation time.

There is, therefore, a need to reduce installation and associated maintenance costs, and to enhance the ease with which aeration diffusers may be installed and maintained.

SUMMARY OF THE INVENTION

In a first aspect of the invention there is provided a diffuser for aerating a fluid, comprising:

an elongate base; and a perforated elastomeric membrane covering a surface of the base and having at least one sealing strip protruding from a face of the membrane and extending along a peripheral region of the membrane;

wherein the at least one sealing strip is engaged in one or more grooves deformed in the base extending in the elongate direction to thereby secure the membrane to the base and seal an interior compartment formed between the face of the membrane and the surface of the base and which receives a flow of gas that permeates through the membrane into the fluid, in use.

The provision of the at least one sealing strip enables the membrane to be secured to the base by simply pressing the sealing strip(s) into the groove or grooves. Similarly, the membrane can be removed by drawing it away from the base such that the at least one sealing strip is pulled from the groove or grooves. Accordingly, assembly of the aerating diffuser and its maintenance can be carried out rapidly. Moreover, more of the peripheral region of the elastomeric membrane may be sealed to the base without the use of cover plates or like means. The elastomeric membrane may be formed from materials such as EPDM, neoprene or silicon rubber.

The diffuser will usually be a plate type diffuser and the base will generally comprise an extrusion. The extrusion may be formed from a plastics material, non-corrosive metal or other suitable substance. Most preferably, the extrusion is an aluminium extrusion. By utilising an extrusion rather than a moulded base for instance, the diffuser may be inexpensively formed to any required length and so substantially minimise production costs as well as the amount of pipework required for a diffuser installation.

In a second aspect of the invention there is provided a diffuser for aerating a fluid, comprising:

a base in the form of an extrusion; and a perforated member covering a surface of the base and having an inner and an outer face;

wherein the perforated member is secured to the base such that a sealed interior compartment is formed between the inner face of the perforated member and the surface of the base and which receives a flow of gas that permeates through the perforated member into the fluid, in use.

The member will also usually be an elastomeric membrane in such embodiments and can be secured to the base as described above and/or with the aid of clamps or cover plates as is conventionally known.

Broadly, in a third aspect of the invention there is provided a method of installing a diffuser for aerating a fluid, comprising the steps of:

locating a base of the diffuser in a desired position above a substantially horizontally extending pipe; and using a strap to secure the base of the diffuser to the pipe and hold the base in the desired position.

Generally, an adaptor will be located between the base of the diffuser and the pipe.

In a fourth aspect of the invention there is provided a method of installing a diffuser for aerating a fluid, comprising the steps of:

locating a base of the diffuser above a substantially horizontally extending pipe such that an opening in the base is aligned with an opening in the crown of the pipe to thereby form a through passageway for the passage of a gas from the pipe into an interior compartment of the diffuser; and using a strap to secure the base of the diffuser to the pipe and hold the opening formed in the base and the opening formed in the pipe in alignment.

If desired, a seal or gasket may be provided between the base of the diffuser and the crown of the pipe to prevent leakage of the fluid from the surrounding environment into the through passageway.

Typically, an adaptor having a passageway for the passage of the gas and which is aligned with the openings will be located between the base and the pipe.

The diffuser can be secured to the pipe with the strap by:

connecting one end of the strap to the diffuser;

drawing the strap around an opposite side of the pipe;

connecting an opposite end of the strap to the diffuser; and tensioning the strap to thereby secure the diffuser to the pipe.

The method of the invention enables the diffuser to be rapidly installed or removed from the piping of a diffuser installation. The method also allows the diffuser to be fixed directly to a pipe without the need for threaded fittings or such like fixed to the pipe, thereby minimising installation costs.

In a fifth aspect of the invention there is provided an assembly comprising an aerating diffuser secured to a pipe by a strap as described above.

The invention may also provide a kit for use in securing the aerating diffuser to a pipe as well as a kit comprising components of the diffuser of the invention itself.

BRIEF DESCRIPTION OF THE DRAWINGS

The resent invention will hereinafter be described is with reference to preferred, non-limiting embodiments of the invention shown in the accompanying drawings, wherein.

DETAILED DESCRIPTION OF PREFERRED EMBODIMENTS OF THE INVENTION

Figure 8:
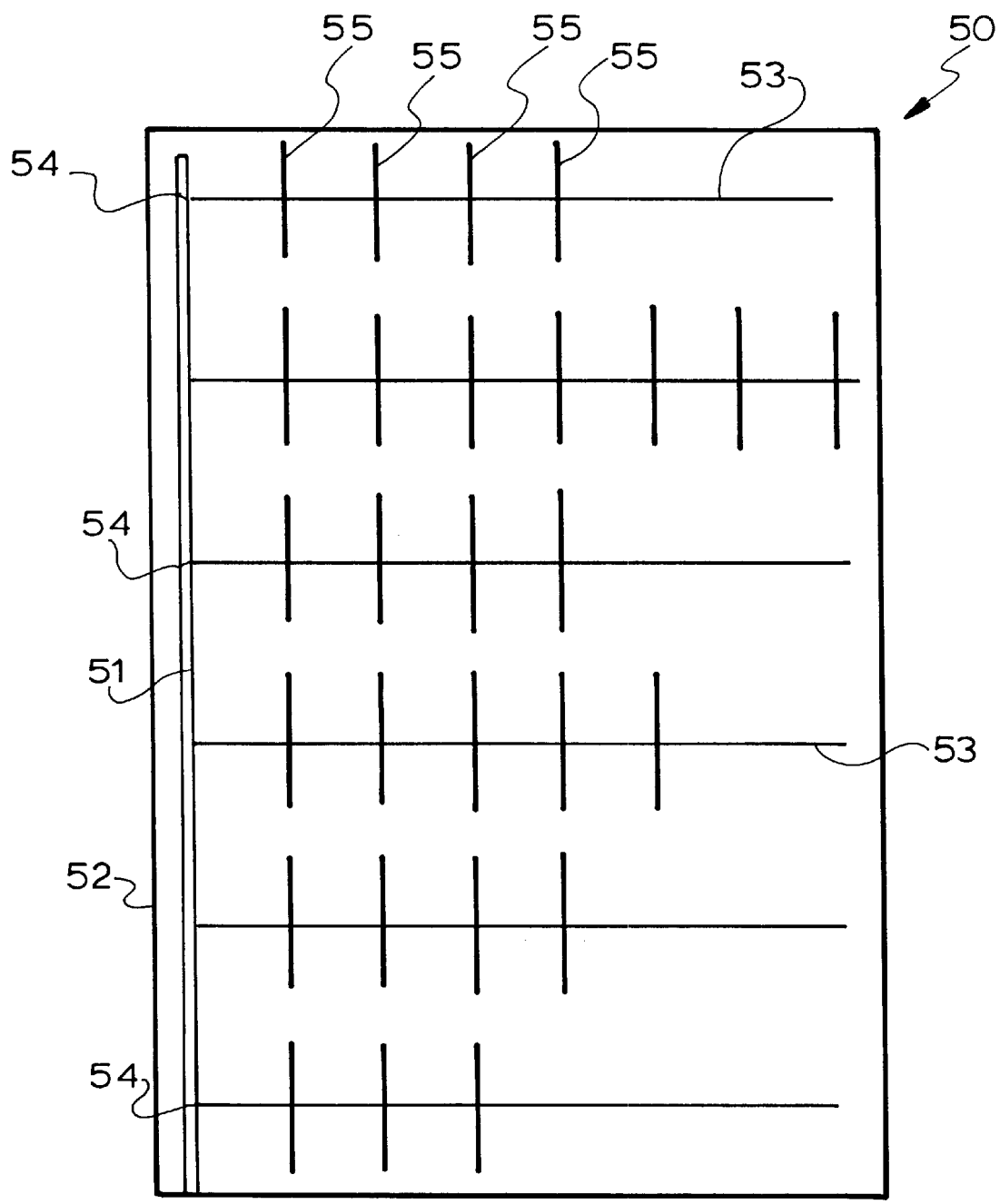
FIG. 8 is a diagrammatic plan view of a waste-water treatment tank showing a typical array of elongate diffusers according to the invention.

In the preferred form of the invention an elongate aeration diffuser is provided to enable a cost effective solution to the problem of providing a large number of such diffusers in a large tank, for example the tank 50 (FIG. 8) of a waste-water treatment installation. The tank would typically be provided with a header pipe 51 extending down one side 52 of the tank with a series of transverse feed pipes connected to the header pipe 51 by T-junctions 54.

A plurality of elongate plate-type diffusers according to the invention which may, for example, be up to 2 metres long but are typically approximately 1.5 metres long are provided at predetermined intervals arrayed across the horizontally extending transverse pipes 53 as shown at 55. In this manner, a comparatively small number of elongate plate-type diffusers may cover an area in the base of a tank 50 which would otherwise require a much larger number of disk or rectangular plate-type diffusers of the type known in the prior art.

Figure 1:
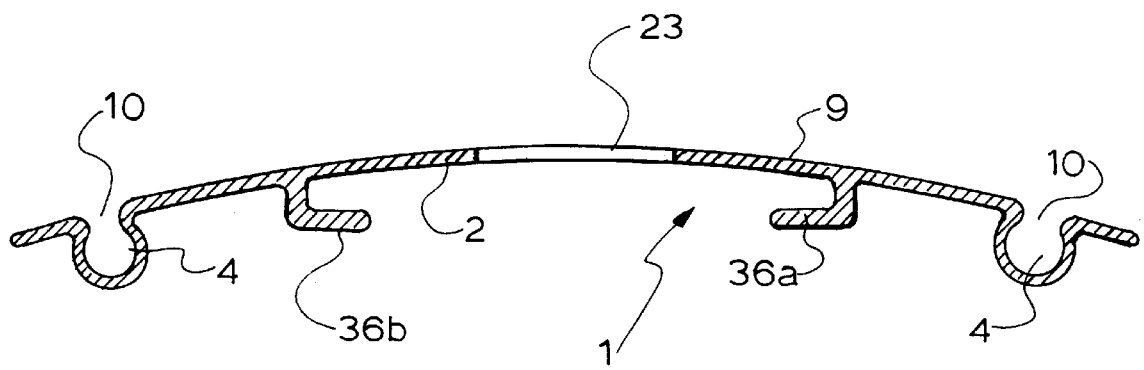
FIG. 1 is an end view of a base of a diffuser embodied by the present invention.
Figure 2:
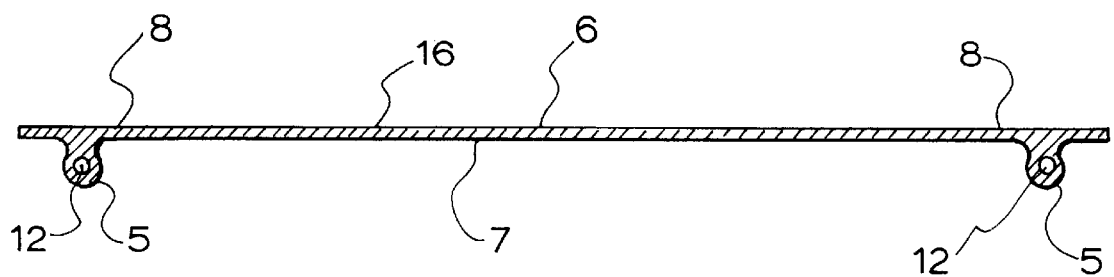
FIG. 2 is an end view of an elastomeric membrane for use with the base shown in FIG. 1.
Figure 3:
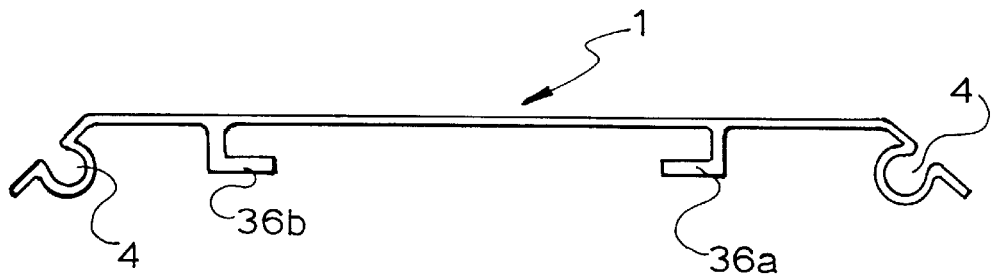
FIG. 3 is an end view of an alternative base section of a diffuser embodied by the invention.

A base 1 for an elongate plate-type aerating diffuser is shown in FIG. 1. The base consists of an anodised aluminium or plastic extrusion having a middle region 2. A pair of grooves 4 are formed in the side sections for receiving sealing strips 5 of the elastomeric membrane 6 illustrated in FIG. 2. As indicated in that figure, sealing strips 5 protrude from an inner face 7 and extend along a peripheral region 8 of the membrane. The base is preferably of curved cross-section as shown in FIG. 1, but may also be substantially flat with downturned outer edges as shown in FIG. 3.

Figure 4:
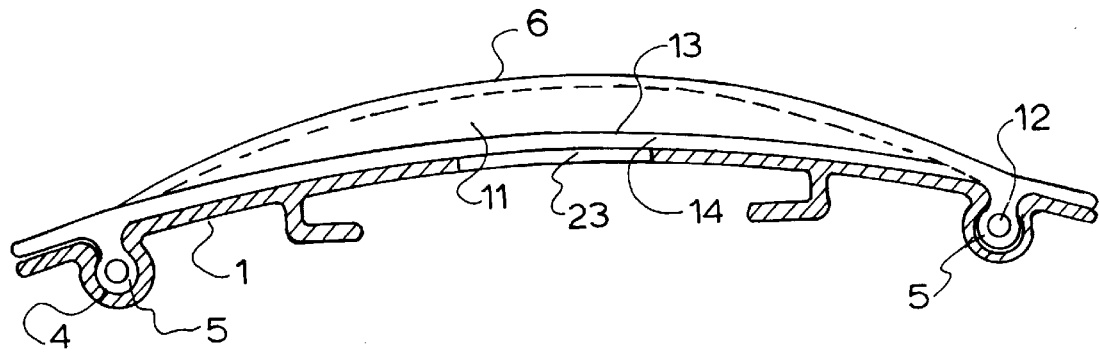
FIG. 4 is an end view of a diffuser formed from the base and elastomeric membrane of FIGS. 1 and 2, in use.

In order to assemble the diffuser, the elastomeric membrane is laid over surface 9 of base 1 and sealing strips 5 are pressed into the corresponding grooves 4 as shown in FIG. 4.

It will be understood that sealing strips 5 are deformable such that they compress when forced through openings 10 of grooves 4 and then expand to press against the inner surface of the grooves, to thereby seal the interior compartment 11 formed between inner face 7 of membrane 6 and surface 9 of base 1. Moreover, sealing strips 5 and grooves 4 are dimensioned such that the sealing strips are held within the grooves once the membrane has been fitted to the base.

The compression of sealing strips 5 may be assisted by the presence of central passageways 12 which extend along the sealing strips. The central passageways, however, are not necessary.

Figure 5:
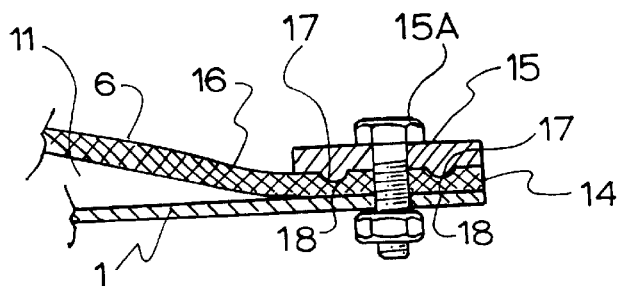
FIG. 5 is a longitudinal cross-sectional view of one end of a diffuser formed from the base and elastomeric membrane of FIG. 2, in use.
Figure 6:
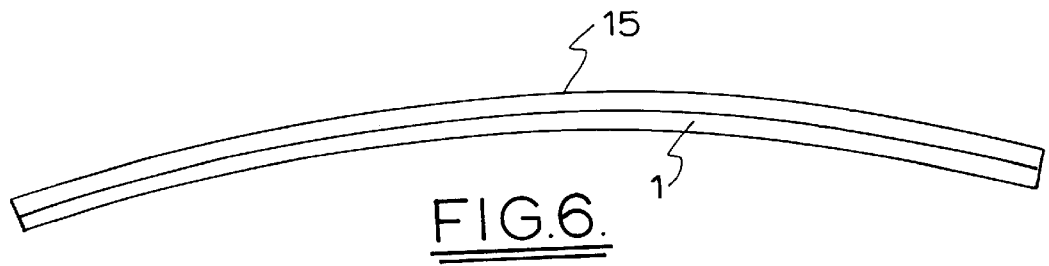
FIG. 6 is an end view of a sealing plate of the diffuser shown in FIG. 5.

End clips (not shown) may be used to seal each end of interior compartment 11 by pressing ends 14 of elastomeric membrane 6 against base 1, respectively. In the preferred form of the invention however, the ends 14 of elastomeric membrane 6 are held against the base 1 as illustrated in FIG. 5 by a seal plate 15 illustrated in FIG. 6. In this instance, the seal plate 15 is secured by bolt and nut assemblies 15A across an outer face 16 of membrane 6. The seal plate has one or more ridges 17 which extend across the plate and are pressed into membrane 6 forming furrows 18 to assist in sealing the interior compartment 11 and maintaining the sealing plate in position. The sealing plate has a form corresponding to that of base 1 as indicated schematically in FIG. 6 (the ridges of the sealing plate are not shown).

In use, low pressure compressed air is fed into interior compartment 11 from a source so that elastomeric membrane 6 is lifted from surface 9 of base 1 and the air is forced through fine slits in the elastomeric membrane causing bubbles to form on outer face 16 and thereby provide oxygen for waste water treatment.

A method of securing the diffuser to a horizontally extending pipe will now be described with reference to FIG. 7. Ass shown in the figure, an adaptor 19 formed from a rigid plastic material housing a bushing 40 made from an elastomeric material is positioned between pipe 20 and base 1 such that a passageway 21 of the bushing is aligned with an opening 22 extending through the crown of pipe 20 as well as with an opening 23 extending through base 1 of the diffuser so that a through passageway which allows the passage of the compressed air from the pipe to interior compartment 11 is formed. The membrane 6 is not shown in FIG. 7, but would be located above the base plate 1 and spaced apart therefrom, with the gap therebetween defining the interior compartment 11.

As can be seen, pipe 20 is received in a recess 24 defined in the adaptor and which has a form corresponding to the outer contour of the pipe. The bushing has rims 25 which extend through openings 22 and 23 and assist in maintaining the assembly in position while pipe 20 is being secured to base 1. The rims 25 also provide a sealing function to inhibit leakage of fluid from the surrounding environment into the pipe or the diffuser itself.

Although the adaptor 19 has been described with a bushing 40 extending therethrough, the adaptor can also be formed wit a simple vertical bore therethrough and elastomeric caskets or O-rings provided about the periphery of each end of the bore to seal the adaptor to the diffuser and the crown of the pipe respectively The securing is achieved by hooking one end 26 of a strap 27 to an attachment block 28 of the diffuser, placing the strap 27 around pipe 20 and locating an opposite end 29 with clip head 32 of clip 31. Clip 31 is attached to link 33 via pin 34. The opposite end of link 33 is further attached to block 35. Clip 31 is then moved to a locked position by being pivoted relative to the pipe such that the face 36 of the clip 31 and strap 27 are drawn toward each other so that the scrap is tensioned and the diffuser is secured to the pipe. The tensioning of the strap also acts to force the pipe and the base against the adaptor and bushing to seal the respective interfaces.

Clip 31 has a provision for adjustment where it is attached to link 33. Threaded bolt 37 of clip 31 extends through a threaded aperture in pin 34 of link 33. The position of link 33 can be adjusted relative to clip 31 by rotating bolt 37 hence enabling the force with which the diffuser and the pipe are held against the adaptor to be varied.

Figure 7:
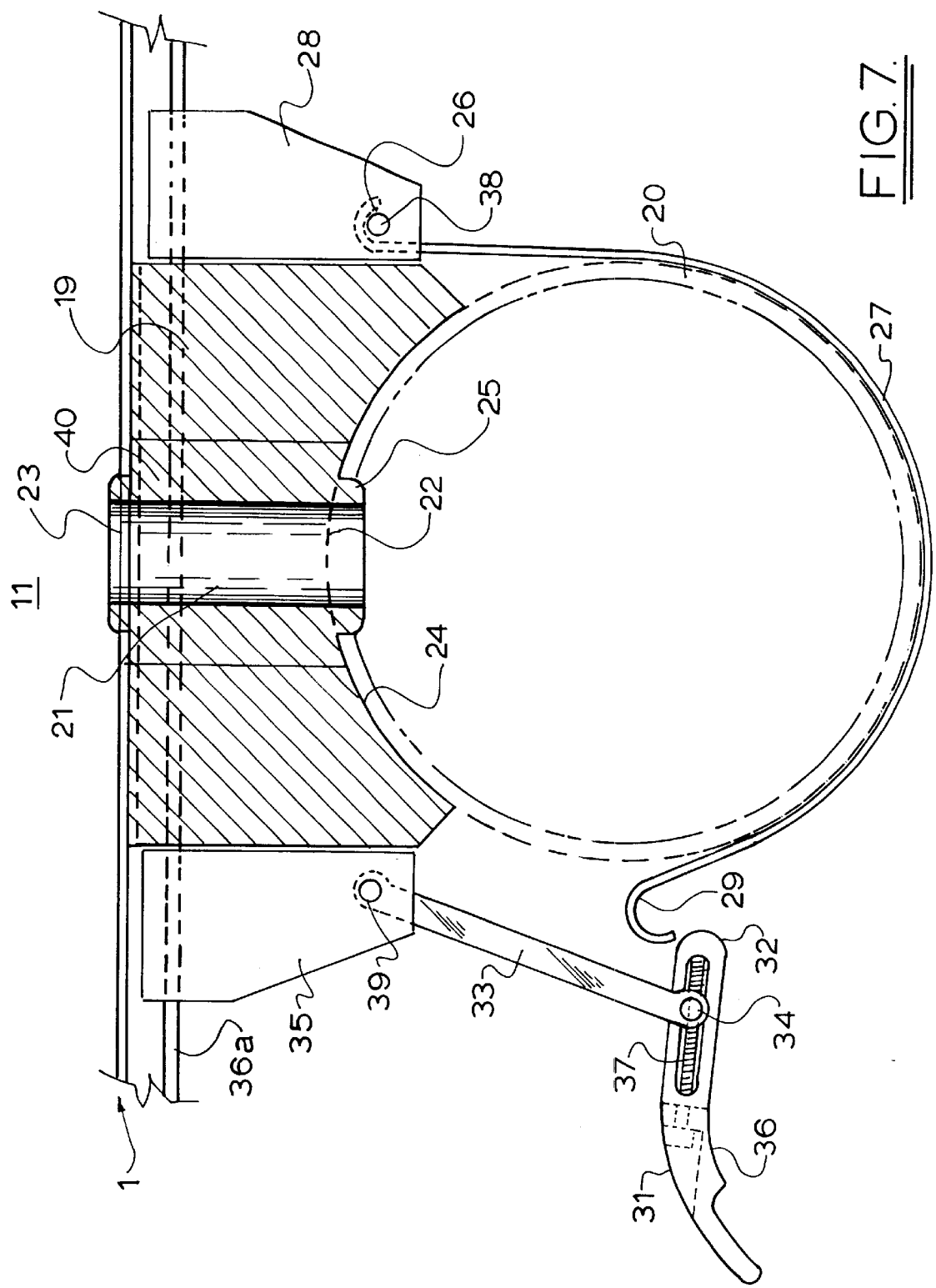
FIG. 7 is an end view of a pipe to which a diffuser is secured. The adaptor and pipe are shown in cross-section.

Base 1 is provided with ledges 36*a* and 36*b* (FIG. 1) to secure attachment blocks 28 and 35 in the manner illustrated in FIG. 7.

Moreover, while the adaptor 19 described above is a separate component from base 1, embodiments may be provided wherein the adaptor is fixed to the base. In such embodiments the ends 26 and 29 of strap 27 may be connected to the diffuser through attachment points on the adaptor itself.

In order to remove the diffuser from pipe 20, clip 31 is simply pivoted in an opposite direction such that face 36 of the clip returns to an unlocked position. Clip head 32 can then be removed from bend 29 of strap 27. End 26 of strap 27 is removable from pin 38 of adjustment block 28. Link 33 remains attached to block 35 via pin 39.

The method, therefore, enables the diffuser to be secured to pipe 20 with only a minimum of preparation of the piping itself. The only preparation required being the drilling of opening 22 in the crown of the pipe 20 which can be done on site during installation. The opening can also be plugged at a later time allowing maximum flexibility in diffuser positioning. Moreover, the diffuser c:an be replaced after initial service to suit changed conditions or requirements as necessary In addition, it will be appreciated that the method allows the diffuser to be readily secured to pipe formed from either a plastic or metal material.

While a number of preferred embodiments have been described hereinbefore, it will be appreciated by the skilled addressee that numerous variations and modifications are possible without departing from the scope of the invention.

What is claimed is:

1. A diffuser for aerating a fluid comprising,
   a) an extruded elongated base member for securement to an air supply pipe, said base having first opposite sides and first opposite ends, and an opening between said first opposite sides and said first opposite ends,
   b) an extruded elongated groove at each said first opposite side of said base member,
   c) an elongated elastomeric membrane covering a surface of the elongated base member and having second opposite sides corresponding to the first opposite sides of said base, and second opposite ends corresponding to the first opposite ends of said base, said elongated elastomeric membrane having an outside surface and an inside surface, said inside surface being formed with elongated projections substantially complementary in cross-section with the cross-section of said elongated grooves to permit a leak-tight sealing engagement between said elongated projections and said elongated grooves whereby an interior compartment is defined between the elongated base member and the elongated elastomeric membrane for receiving a flow of gas through the opening in said base such that the flow of gas into the interior compartment can permeate through the elongated elastomeric membrane to aerate fluid outside the outside face of the elongated elastomeric membrane.

2. The diffuser according to claim 1 wherein the elongated elastomeric membrane and the elongated projections are extruded.

3. The diffuser according to claim 1 wherein the elongated elastomeric membrane and the elongated projections are extruded.

4. A system for aerating a fluid in a tank comprising a plurality of elongate diffusers arrayed transversely across an air feed pipe which extends substantially horizontally close to the bottom of said tank, said diffusers being provided at predetermined intervals along said air feed pipe so that each of said diffusers extends away from said air feed pipe;
   wherein each of said diffusers is mounted onto said air feed pipe; and
   wherein each of said elongate diffusers includes:
      an elongate base
      an elongate flexible perforated member covering a surface of the base and having an inner face and an outer face and wherein the perforated member is secured to the base such that an elongate sealed interior compartment is formed between the inner face of the perforated member and the surface of the base, and said interior compartment receives a flow of gas from the air feed pipe which permeates through the perforated member into the tank fluid, in use, and wherein the means of distributing gas along the elongate length of the diffuser, away from the feed pipe is the interior compartment formed between the perforated member and the base.

5. The system of claim 4 wherein the base of each diffuser is an elongate extruded member.

6. The system of claim 4 wherein the perforated member of each diffuser is formed by extrusion.

7. The system of claim 5 wherein said base has an extruded profile which includes two elongate grooves running axially along opposed side regions of said base, and said grooves each include a deeper wider portion and a shallower narrower portion.

8. The system of claim 7 wherein:
   said perforated member of each diffuser is formed by extrusion; and
   said perforated member has an extruded profile which includes spaced apart axially extending sealing strips protruding from the inner surface thereof, each of said sealing strips including a deformable distal wider portion and a narrower intermediate portion which is intermediate the wider portion and the inner surface;

wherein each sealing strip can be inserted into a corresponding groove in the base profile by deforming the wider portion of the sealing strip so that said wider portion can pass through the narrower portion of the groove and into the wider portion of the groove, where said wider portion of the sealing strip is retained.

9. A diffuser for aerating a fluid, comprising:

an elongate base; and an elongate perforated member covering a surface of the base and having an inner and an outer face;

wherein, in use, the perforated member is secured to the base such that an elongate sealed interior compartment is formed between the inner face of the perforated member and the surface of the base and said interior compartment receives a flow of gas that permeates through the perforated member into the fluid, and wherein the means of distributing gas along the elongate length of the diffuser is the interior compartment formed between the base and the perforated member; and wherein the diffuser is for mounting on a substantially horizontally extending pipe so that a longitudinal axis of the diffuser extends away from the pipe, such that a passageway is provided for the passage of gas from the pipe into the interior compartment of the diffuser, and so that a plurality of such diffusers may be arrayed across the horizontally extending pipe.

10. The diffuser of claim 9, wherein the base of each diffuser is an elongate extruded member.

11. The diffuser of claim 9, wherein the perforated member of each diffuser is formed by extrusion.

12. The diffuser of claim 10, wherein said base has an extruded profile which includes two elongate grooves running axially along opposed side regions of said base, and said grooves each include a deeper wider portion and a shallower narrower portion.

13. The diffuser of claim 12, wherein:

said perforated member is formed by extrusion; and said perforated member has an extruded profile which includes two spaced apart axially extending sealing strips extending from the inner surface thereof, each of said sealing strips including a deformable distal wider portion and a narrower intermediate portion which is intermediate the wider portion and the inner surface;

wherein each sealing strip can be inserted into a corresponding groove of the base profile by deforming the wider portion of the sealing strip so that it can pass through the narrower portion of the groove and into the wider portion of the groove, where said wider portion of the sealing strip is retained.

14. A diffuser for aerating a fluid, comprising:

an elongate base; and an elongate perforated member, which has an elongate perforated surface, and which, in use, covers a surface of the base;

wherein said base includes two elongate grooves each running axially along a side region of said base, and said grooves each include a deeper wider portion and a shallower narrower portion; and wherein said perforated member includes spaced apart axially extending sealing strips extending from a surface thereof, each of said sealing strips including a deformable distal wider portion and a narrower intermediate portion which is intermediate the wider portion and the perforated surface of the perforated member;

wherein each sealing strip can be inserted into a corresponding groove by deforming the wider portion of the sealing strip so that it can pass through the narrower portion of the groove and into the wider portion of the groove, where said wider portion of the sealing strip is retained.

15. The diffuser of claim 14, wherein the grooves have openings for receiving the sealing members, and the openings are, in use, provided on a generally upwardly facing surface of the base.

16. The diffuser of claim 14, wherein the distal wider portion of at least one of the sealing strips includes a cavity therein.

17. The diffuser of claim 14 wherein the base comprises an extruded profile.

18. The diffuser of claim 14 wherein the perforated member comprises an extruded profile.

* * * * *